United States Patent
Renault et al.

(10) Patent No.: US 12,138,869 B2
(45) Date of Patent: Nov. 12, 2024

(54) METHOD FOR MANUFACTURING A PREPREG MADE OF A COMPOSITE MATERIAL

(71) Applicant: Institut de Recherche Technologique Jules VERNE, Bouguenais (FR)

(72) Inventors: Thierry Renault, Dinard (FR); Sébastien Guéroult, Nantes (FR)

(73) Assignee: INSTITUT DE RECHERCHE TECHNOLOGIQUE JULES VERNE, Bouguenais (FR)

( * ) Notice: Subject to any disclaimer, the term of this patent is extended or adjusted under 35 U.S.C. 154(b) by 350 days.

(21) Appl. No.: 16/968,480

(22) PCT Filed: Feb. 8, 2019

(86) PCT No.: PCT/EP2019/053186
§ 371 (c)(1),
(2) Date: Aug. 28, 2020

(87) PCT Pub. No.: WO2019/155013
PCT Pub. Date: Aug. 15, 2019

(65) Prior Publication Data
US 2021/0039338 A1    Feb. 11, 2021

(30) Foreign Application Priority Data
Feb. 9, 2018  (FR) ..................... 18 51108

(51) Int. Cl.
*B29C 70/46*    (2006.01)
*B29B 15/12*    (2006.01)
(Continued)

(52) U.S. Cl.
CPC ............ *B29C 70/465* (2013.01); *B29B 15/12* (2013.01); *B29C 70/50* (2013.01); *B29K 2101/12* (2013.01); *B29K 2105/0872* (2013.01)

(58) Field of Classification Search
CPC ..... B29C 70/465; B29C 70/50; B29C 70/506; B29C 70/887; B29C 70/885; B29C 70/687; B29C 70/685
See application file for complete search history.

(56) References Cited

U.S. PATENT DOCUMENTS 3,058,863 A * 10/1962 Arbit ...................... B29C 70/50
156/244.11
3,567,566 A *  3/1971 Bandel et al. .......... B32B 27/00
473/121
(Continued)

FOREIGN PATENT DOCUMENTS

EP    0084135 A2    7/1983
FR    3014731 A1    6/2015
(Continued)

OTHER PUBLICATIONS

Reemay Berry Global product data sheet, downloaded Jan. 12, 2024. (Year: 2024).*
(Continued)

*Primary Examiner* — Matthew J Daniels
(74) *Attorney, Agent, or Firm* — HAUPTMAN HAM, LLP (57) ABSTRACT

The method comprises the following consecutive steps: providing at least one reinforcement layer and at least one matrix sheet made of thermoplastic material; forming a complex with the reinforcement layer and the matrix sheet; and placing the complex in a production tool so that the thermoplastic material impregnates the fibers of the reinforcement layer(s) in order to form a prepreg. The method comprises, in the production tool, the following consecutive steps: heating the complex to a temperature higher than the melting temperature of the thermoplastic material without applying pressure; heating the complex to a temperature
(Continued)

higher than the melting temperature of the thermoplastic material while applying a production pressure higher than atmospheric pressure.

20 Claims, 6 Drawing Sheets

(51) Int. Cl.
*B29C 70/50* (2006.01)
*B29K 101/12* (2006.01)
*B29K 105/08* (2006.01)

(56) References Cited

U.S. PATENT DOCUMENTS

| | | | | |
|---|---|---|---|---|
| 3,825,642 | A * | 7/1974 | Kies | B27N 3/06 |
| | | | | 156/212 |
| 3,937,559 | A * | 2/1976 | Ferrentino | G02B 6/4403 |
| | | | | 385/104 |
| 4,098,943 | A * | 7/1978 | Degginger | B32B 27/20 |
| | | | | 156/324 |
| 4,445,951 | A * | 5/1984 | Lind | D04H 3/12 |
| | | | | 428/102 |
| 4,469,543 | A * | 9/1984 | Segal | B32B 27/36 |
| | | | | 156/283 |
| 5,316,604 | A * | 5/1994 | Fell | B29C 66/91931 |
| | | | | 428/116 |
| 5,773,373 | A * | 6/1998 | Wynne | B32B 37/206 |
| | | | | 442/79 |
| 6,460,240 | B1 * | 10/2002 | Kielies | B32B 5/26 |
| | | | | 156/307.7 |
| 7,897,248 | B2 * | 3/2011 | Barrera | B82Y 30/00 |
| | | | | 524/495 |
| 9,248,613 | B2 * | 2/2016 | Wilkerson | B29C 43/265 |
| 9,511,550 | B2 * | 12/2016 | Mine | B29C 70/543 |
| 2002/0192467 | A1 * | 12/2002 | Secrist | B29C 70/50 |
| | | | | 156/60 |
| 2010/0215887 | A1 | 8/2010 | Kawabe | |
| 2012/0302118 | A1 * | 11/2012 | Kasuya | B29C 70/465 |
| | | | | 525/240 |
| 2016/0271860 | A1 * | 9/2016 | Mashima | B29C 51/082 |
| 2017/0028689 | A1 * | 2/2017 | Verpoest | B32B 5/26 |
| 2018/0215110 | A1 * | 8/2018 | Kawabe | B29C 48/08 |

FOREIGN PATENT DOCUMENTS

| | | |
|---|---|---|
| WO | 2005033393 A1 | 4/2005 |
| WO | WO-2005033390 A2 * | 4/2005 ............. B29B 15/12 |

OTHER PUBLICATIONS

International Search Report for PCT/EP2019/053186 dated May 14, 2019.

Search Report for French Application No. 18 51108 dated Oct. 11, 2018.

* cited by examiner

METHOD FOR MANUFACTURING A PREPREG MADE OF A COMPOSITE MATERIAL

CROSS-REFERENCE TO RELATED APPLICATIONS

This is the National Stage of PCT international application PCT/EP2019/053186, filed on Feb. 8, 2019, which claims the priority of French Patent Application No. 18 51108, filed Feb. 9, 2018, both of which are incorporated herein by reference in their entirety.

The present invention relates to a method for manufacturing an intermediate prepreg, intended to form at least one portion of a finished part, said prepreg being made from a composite material comprising a matrix made from a thermoplastic material and reinforcing fibers embedded in the matrix, the method comprising the following consecutive steps:
  providing at least one reinforcement layer and at least one matrix sheet made of thermoplastic material;
  forming a complex with said reinforcement layer and said matrix sheet; and
  placing the complex in a prepreg production tool, the production tool being heated to a temperature higher than the melting temperature of the thermoplastic material so that the thermoplastic material impregnates the fibers of the reinforcement layer(s) in order to form a prepreg.

Such manufacturing methods are known. Such a method is used to manufacture a thermoplastic prepreg made of an intermediate composite material, also known as "organo-sheet". Such prepregs are next shaped, and optionally associated with other prepreg parts, to manufacture a light finished part having satisfactory mechanical properties. The finished parts are for example used in the automotive industry to form vehicle body parts, reinforcing or protective panels, seat parts or the like.

The inventors have noted, however, that the distribution of the material of the matrix in the prepreg is not satisfactory when the complex is subject to heating and pressure that may melt the material of the matrix in order to impregnate the fibers. Indeed, under the effect of the temperature and the pressure, the thermoplastic material of the complex tends to creep toward the periphery of the prepreg, which causes a nonuniform impregnation of the fibers. Such unwanted creep makes the method unsuitable for industrialization to manufacture prepregs with controlled properties, in particular mechanical, in a high-speedmethod that requires strong reproducibility. Furthermore, this phenomenon creates unwanted waste of the thermoplastic material.

One aim of the invention is to propose a method for manufacturing a prepreg having satisfactory properties, offering a high production pace, and improving the impregnation of the fibers of the prepreg by the thermoplastic material.

To that end, the invention relates to a manufacturing method of the aforementioned type, in which:
  the complex is heated to a temperature higher than the melting temperature of the thermoplastic material without applying pressure on said complex,
  the complex is heated to a temperature higher than the melting temperature of the thermoplastic material while applying a production pressure higher than atmospheric pressure on the complex.

The method according to the invention in particular makes it possible to improve the impregnation of fibers by the thermoplastic material. In particular, the step for heating without applying pressure makes it possible to melt the thermoplastic material without the latter tending to creep toward the periphery of the prepreg, and the following step of heating while applying pressure makes it possible to obtain a good impregnation of fibers by the thermoplastic material.

According to specific embodiments of the invention, the process further has one or more of the following features, considered alone or according to any technically possible combination(s):
  the method comprises the following consecutive steps, before placing the complex in the production tool:
    placing at least the matrix sheet in a treatment tool,
    heating said sheet to a temperature lower than the melting temperature of the thermoplastic material,
  the matrix sheet is placed in the treatment tool with the rest of the complex,
  the matrix sheet is crushed in the treatment tool by applying pressure on said sheet,
  the temperature of the treatment tool is between 70° C. and 200° C., and is advantageously equal to 150° C.,
  the thermoplastic material comprises polyethylene terephthalate,
  the complex comprises at least two matrix sheets placed on a first side of the reinforcement layer, and at least one matrix sheet placed on a second side of said reinforcement layer,
  the complex includes at least two reinforcement layers, each reinforcement layer being placed between at least two matrix sheets on a first side and at least one matrix sheet on a second side,
  the reinforcement sheets have at least two different fiber orientations,
  the formation of the complex comprising said reinforcement sheets having at least two different fiber orientations is done outside the production tool,
  the pressure applied on the complex by the production tool is between 1 bar and 20 bars, advantageously between 2 bars and 10 bars.

Other features and advantages of the invention will appear upon reading the following description, provided solely as an example and done in reference to the appended drawings, in which.

The method according to the invention is suitable for manufacturing prepregs, also called "organo-sheets". These prepregs are next shaped to manufacture a finished part intended for example to constitute a motor vehicle seat part, a trim element such as a door panel, a body shell part, a bodywork part or the like. The prepreg 10 for example assumes the form of a rigid planar plate.

The prepreg 10 includes a matrix 12 made from a thermoplastic material 13, in which reinforcing fibers 16 are embedded.

The thermoplastic material 13 of the prepreg 10 is obtained from at least one nonwoven matrix sheet 18 comprising the thermoplastic material 13. The thermoplastic material 13 advantageously comprises polyethylene terephthalate (PET). It is also possible to use derivatives of PET, compounds such as polypropylene (PP), polyamide compounds or other thermoplastics.

The thickness of the matrix sheet $e_0$ before the manufacturing of the prepreg 10 is greater than or equal to 1 mm, for example substantially equal to 2 mm. PET has the advantage of being inexpensive relative to the thermoplastic materials generally used, for example polyamide (PA), to produce the matrix of parts made from composite material.

According to one embodiment, the matrix sheet 18 is formed solely from thermoplastic material. This thermoplastic material can be in the form of fibers, like in the case of a nonwoven or in the form of a film.

The mass per unit area of the matrix sheet 18 is for example between 100 $g/m^2$ and 500 $g/m^2$, and is advantageously equal to 300 $g/m^2$.

According to another embodiment, the matrix sheet 18 is a semi-prepreg of thermoplastic fibers made of PET and reinforcing fibers 16, such as a fabric of fibers intermingled with reinforcing fibers 16 and fibers of thermoplastic material, or co-woven with reinforcing fibers 16 and fibers of thermoplastic material. The fibers of thermoplastic material make up at least 10%, advantageously 30%-60%, by weight of the matrix sheet 18, and the reinforcing fibers 16 make up no more than 90%, advantageously 40%-70%, in terms of weight of the matrix sheet 18.

The reinforcing fibers 16 in the matrix sheet 18 are for example glass fibers, or carbon fibers, aramid fibers, basalt fibers, natural fibers or the like. The reinforcing fibers 16 in the matrix sheet 18 may also be a mixture of said fibers.

The reinforcing fibers 16 embedded in the matrix are further obtained from at least one reinforcement layer 17 comprising reinforcing fibers 16. The fibers 16 are for example glass fibers, or carbon fibers, aramid fibers, basalt fibers, natural fibers or the like. The reinforcement layer 17 may also comprise a mixture of said fibers. According to one embodiment, the fibers 16 of the reinforcement layer 17 are of the same nature as the fibers 16 of the matrix sheet 18. In a variant, they are different.

The mass per unit area of the reinforcement layer 17 is for example between 100 $g/m^2$ and 1000 $g/m^2$, and is advantageously equal to 600 $g/m^2$.

The reinforcement layer 17 advantageously has unidirectional woven fibers, non-crimp fabrics, or layers made from glass fibers having random orientations.

Such fibers are chosen to reinforce the finished part, which for example makes it possible to reduce its thickness while preserving satisfactory mechanical properties. Thus, the composite material part is made lighter relative to a part made solely from thermoplastic material while having identical, or even improved mechanical properties.

Figure 1:
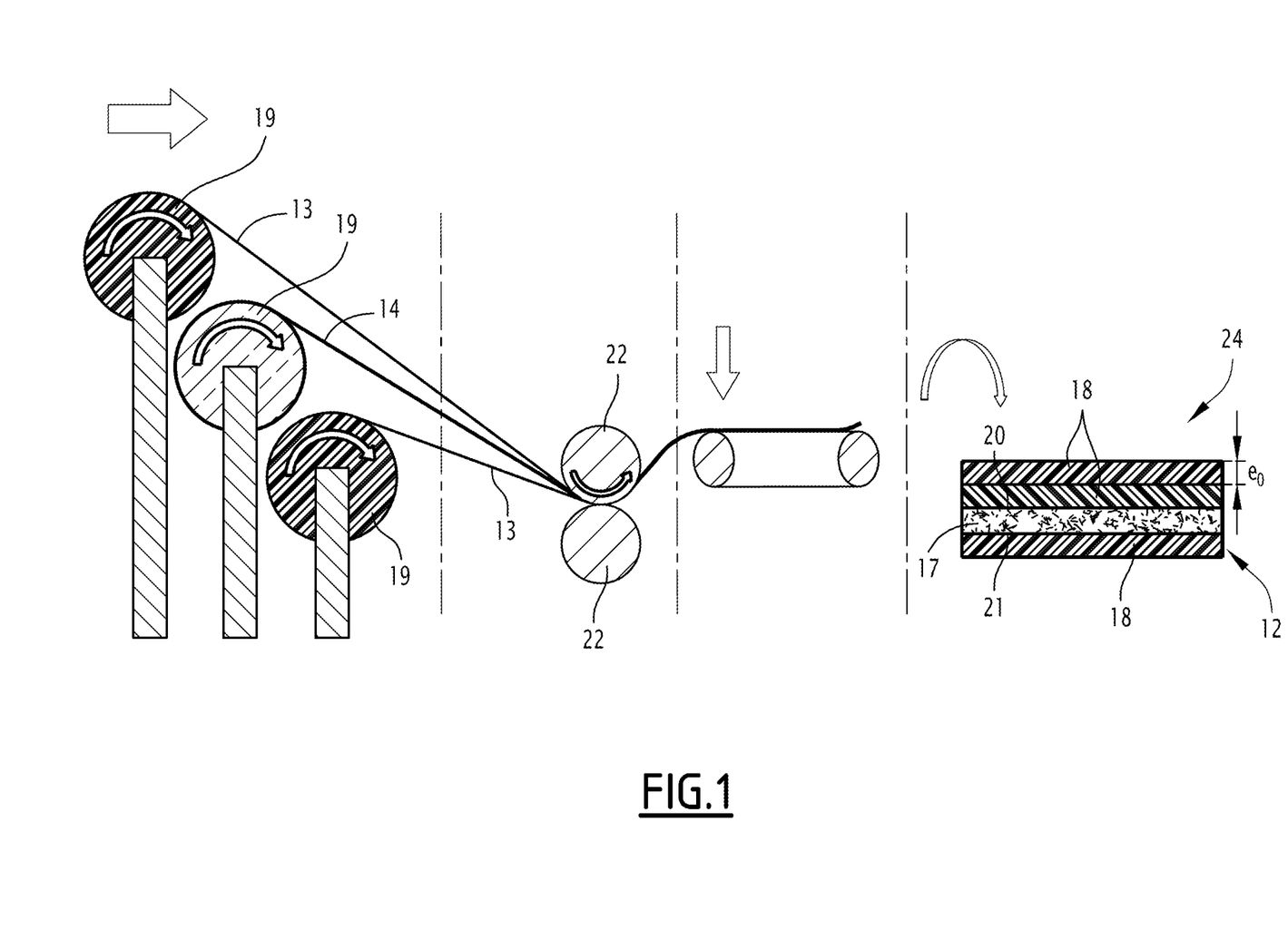
FIG. 1 is an illustration of the steps for obtaining a complex before the impregnation of the fibers by a thermoplastic material in the production tool according to one embodiment of the invention.

Advantageously, first, at least a reinforcement layer 17 and a matrix sheet 18 are unwound from storage rollers 19 and positioned one on the other. According to one particular example, the reinforcement layer 17 is sandwiched between the layers of thermoplastic material 13.

Advantageously and in reference to FIG. 1, at least two matrix sheets 18 are placed on a first side 20 of at least one reinforcement layer 17, and at least one matrix sheet 18 is placed on a second side 21 of said at least one reinforcement layer 17. In a variant, only one matrix sheet 18 is placed on the first side 20 of the reinforcement layer 17, and no matrix sheet 18 is placed on the second side 21 of the reinforcement layer 17. The obtained stack forms a complex 24 by passing the reinforcement layer 17 and the matrix sheet 18 between two preparation rollers 22. It is possible to manufacture, including in a high-speed industrial context, stacks with a high number of layers, for example 8 to 16 layers, for example with a thickness of at least 1 mm to 2 mm per layer.

According to one embodiment of the invention, the complex 24 is made up of layers stacked in the following order: reinforcement layer, sheet, sheet, reinforcement layer, sheet, sheet, reinforcement layer. According to another embodiment of the invention, the complex 24 is made up of layers stacked in the following order: reinforcement layer, sheet, sheet, reinforcement layer, sheet, reinforcement layer, sheet, sheet, reinforcement layer. It is understood that the number and order of the layers may vary depending on the desired properties of the prepreg part and/or the finished part to be produced.

Advantageously, the complex 24 comprises at least two reinforcement layers 17. The reinforcement layers 17 for example have at least two different orientations of fibers, which makes it possible to improve the mechanical features of the prepreg part 10 in all directions thereof.

Thus, in order to obtain a prepreg comprising fibers in several different orientations, it is possible to provide a single complex comprising fibers in several different orientations before impregnating this unique complex, instead of combining several complexes each comprising fibers in a single direction.

According to one embodiment, the stack of reinforcement layers 17 having at least two different orientations is made outside the production tool 28 described below. This makes it possible to prepare the complexes 24 comprising the reinforcement layers 17 in parallel with the impregnation step, and thus to increase the production pace. Thus, the method makes it possible to produce preimpregnated parts at a fast pace and low cost. More specifically, an operator can prepare complexes 24 by stacking of reinforcement layers 17 outside the production tool 28, for example near the production tool 28 or at another station separate from the tool. In parallel, the production tool 28 is used to impregnate already-prepared complexes 24, in order to reserve the use of the production tool 28 for the impregnation of complexes 24, which makes it possible to prevent forming the complex 24 in the production tool 28 and thus to reduce the immobilization time of the production tool 28.

Figure 2:
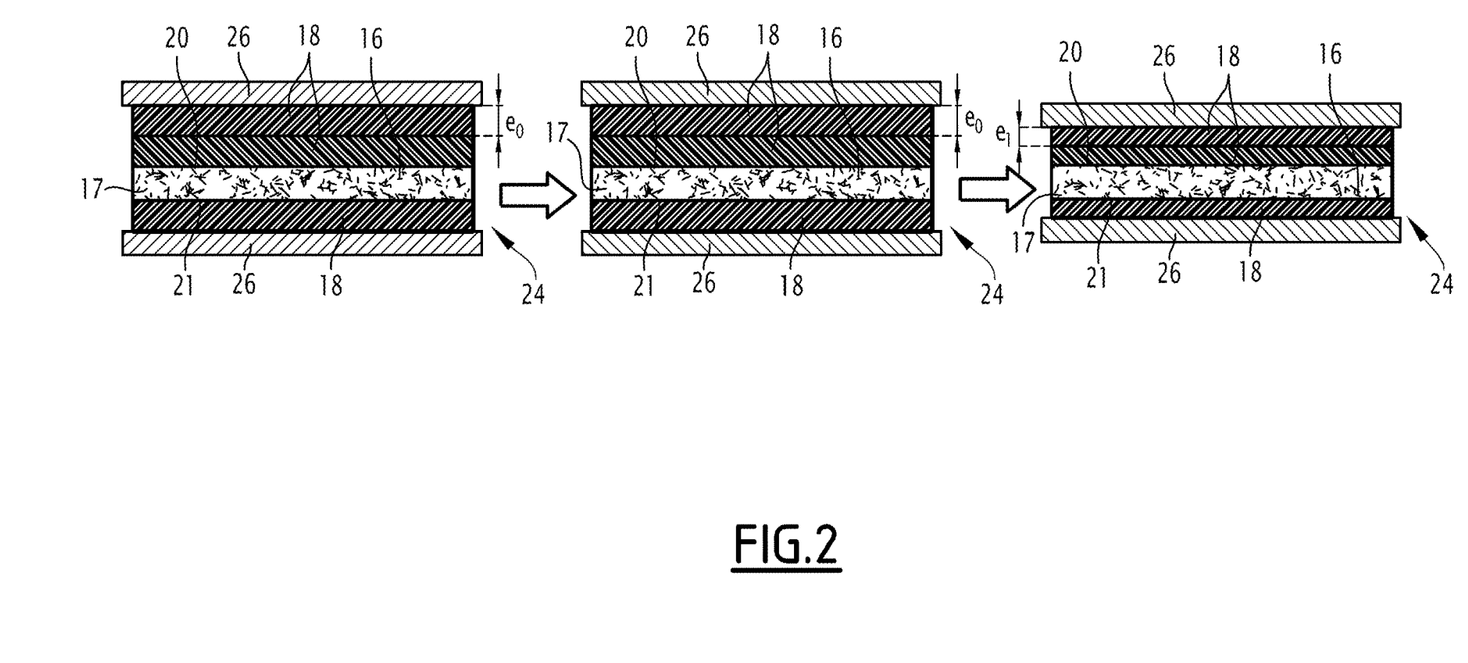
FIG. 2 is an illustration of a complex before and after the preheating.

In reference to FIG. 2, after forming the complex 24, the method comprises a treatment step. The complex 24 is placed in a treatment tool 26, and the treatment tool 26 heats the complex 24 to a temperature lower than the melting temperature of the thermoplastic material 13.

The treatment tool 26 is for example formed by two heated plates between which reinforcement layers 17 and/or matrix sheets 18 can be placed. In a variant, the treatment tool 26 is a crushing tool.

The preheating temperature by the treatment tool 26 is between 70° C. and 200° C., advantageously between 90° C. and 165° C., and is more advantageously equal to 150° C.

The treatment duration is between 20 and 60 seconds, advantageously between 25 and 45 seconds for a complex 24.

Advantageously, the treatment tool 26 applies a treatment pressure below 50 bars, advantageously inclusively between 5 and 20 bars, on the complex 24.

The preheating step with crushing makes it possible to reduce the thickness of the matrix sheet 18 and thus to reduce the exposure time to the temperature higher than the melting temperature of the thermoplastic material 13 necessary to form the prepreg 10 during the later production steps, which will be described later.

In a variant not shown in the Figures, only the matrix sheets 18 are placed in the treatment tool 26 and heated and optionally crushed by the treatment tool 26. These crushed sheets are next associated with the reinforcement layers 17 in order to form the complex 24.

As shown in FIG. 2, this treatment step in particular makes it possible to reduce the porosity and the thickness of the matrix sheets 18 in the complex 24 in order to facilitate the remainder of the manufacturing method. The reduced thickness of matrix sheets $e_1$ is for example substantially equal to 0.3 mm from non-crushed sheets with a thickness greater than or equal to 1 mm.

Advantageously, the complex 24 is next cut by a cutting device (not shown in the Figures) into several cut complexes each forming a part of the complex 24 and comprising at least one reinforcement layer 17 and matrix sheets 18. The cutting device is suitable for cutting the complexes 24 such that each of these cut complexes has a dimension smaller than or equal to a corresponding dimension of the finished part that the prepreg 10 will be intended to manufacture.

Advantageously, the reinforcement layers 17 and the matrix sheets 18 of each complex 24 are next joined, for example by sewing or stitching so as to locally secure the reinforcement layers 17 and the matrix sheets 18. The sewing is preferably done in a zigzag. In a variant, the assembly of the reinforcement layers 17 and matrix sheets 18 is done before they are cut, or before they are treated. Also in a variant, the cutting and/or the fixing of the layers of the complex 24 to one another can be done before the preceding step described above.

It is possible to manufacture reinforcement layers 17 by assembly, in a same plane, of pieces of reinforcement layers 17 having any desired geometry. The layers thus obtained are in turn used to manufacture the complexes 24 by assembling them with matrix sheets 18, which can also have variable geometries. It is thus possible to prevent having to cut very thick complexes 24.

Advantageously, the most stressed seams are covered by strips (not shown in the Figures) of unidirectional fibers, for example carbon fibers, in order to reinforce these seams. The fibers of said strips are oriented substantially parallel to the general direction of progression of the seams that they cover.

In reference to FIGS. 3 to 5, the different steps of the method for producing a prepreg part 10 with a production tool 28 according to a first embodiment of the invention will now be described.

According to the first embodiment of the invention, each prepreg part 10 is produced in a production tool 28 formed by a press 30. The press 30 is movable between an open position, in which the reinforcement layers 17 and the matrix sheets 18 can be placed in the press 30 and a closed position in which the press 30 acts on these materials 17, 18 in order to form the prepreg 10.

Figure 3:
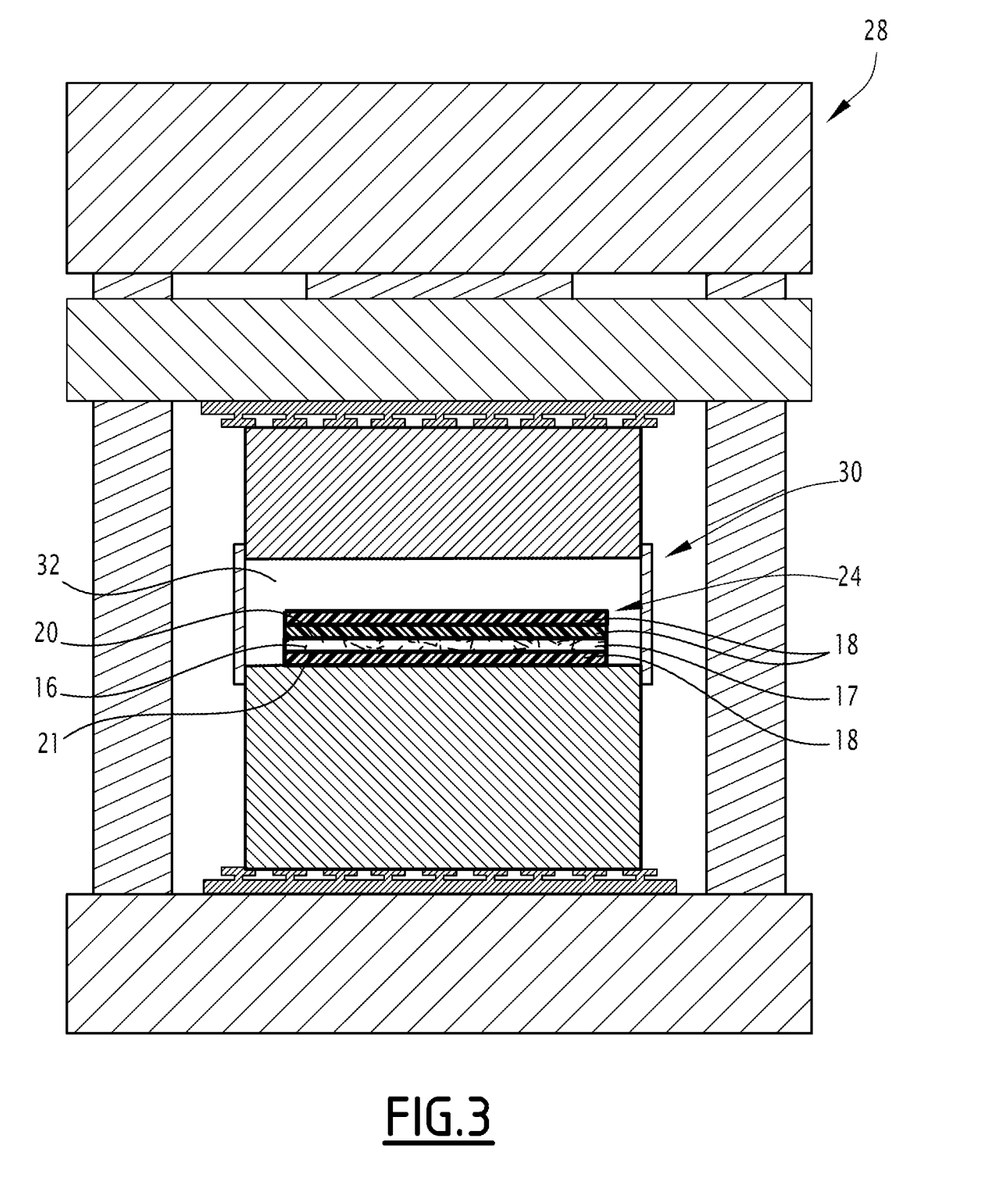
FIGS. 3 to 5 are schematic illustrations of the production tool according to a first embodiment of the invention during successive steps of the production method.

In reference to FIG. 3, the production tool 28 comprises a single press 30. In a variant, the production tool 28 comprises a plurality of presses 30 for simultaneously producing several prepregs 10. The surfaces of the press 30 in contact with the complex 24 are advantageously treated in order to avoid the adhesion of the thermoplastic material 13 on the surfaces.

The surfaces of the press intended to be in contact with the complex 24 are substantially planar and parallel.

The press 30 is heated to a temperature higher than the melting temperature of the PET, that is to say a temperature higher than 260° C. The press 30 is heated by heating means integrated into the press 30, for example by induction, by microwaves, by circulation of a heat transfer fluid, or by electrical resistances or by any other suitable means.

The press 30 comprises a space 32 intended to receive the complex 24. The temperature of the space 32 during the heating is between 260° C. and 330° C. for PET. This temperature is suitable for the use of other thermoplastic materials.

As shown in FIG. 3, at least one complex 24 is placed in the space 32, the press 30 being in its open position. The expression "at least one complex 24 is placed in the space of the production tool" here means that the complex 24 already produced is placed in the production tool 28, as previously described, or that the complex 24 is produced in the production tool 28.

Figure 4:
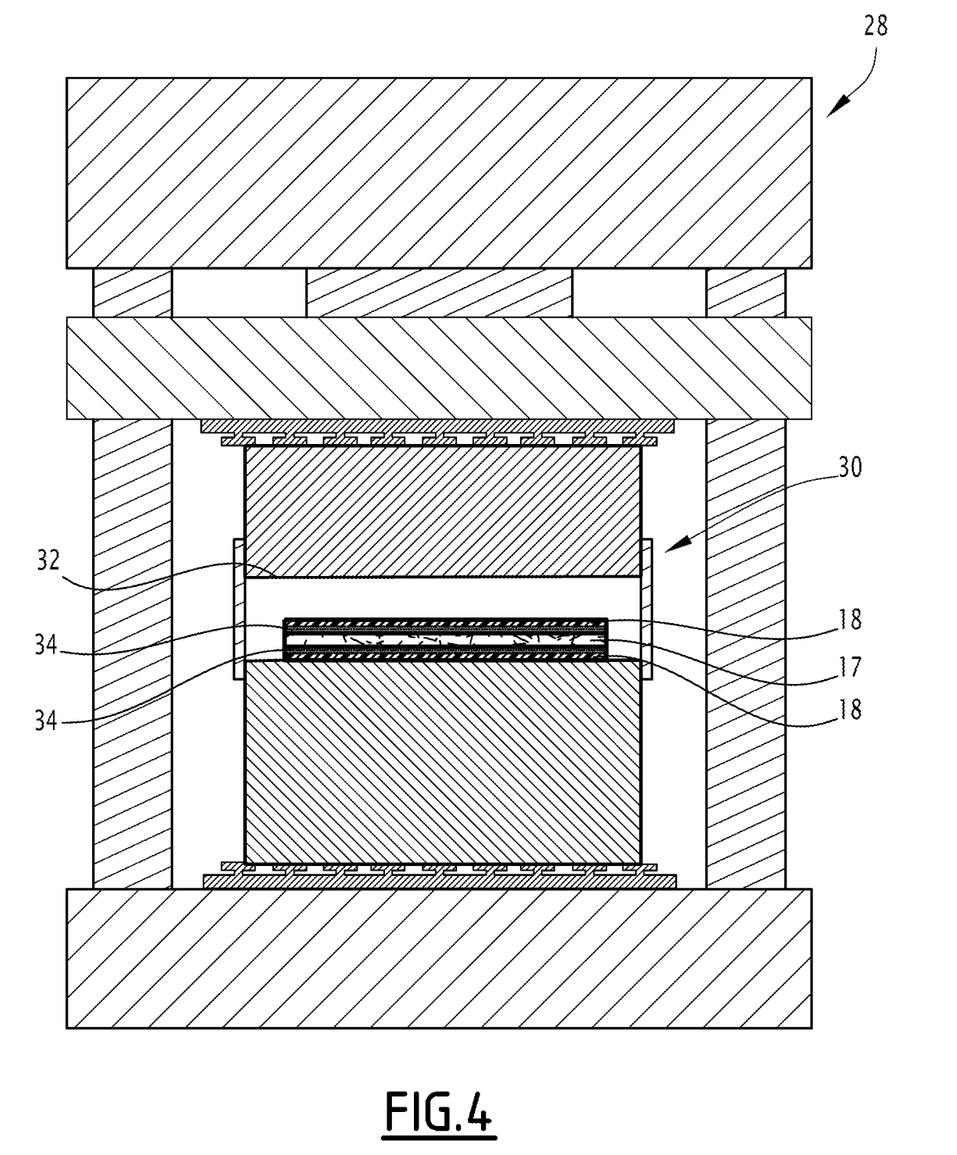

In reference to FIG. 4, the press 30 heats the complex 24 to a temperature higher than the melting temperature of the thermoplastic material 13 without applying pressure on the complex 24. "Without applying pressure" means that the complex 24 is left at atmospheric pressure during this heating step. The thermoplastic material 13 melts under the effect of the heating, and partially impregnates the layer(s) of fibers 17 and forms impregnated layers 34 without the thermoplastic material 13 flowing toward the edges of the layers under the effect of a pressure applied on the complex 24.

This heating step without pressure in the press 30 lasts substantially between 30 and 120 seconds, and is advantageously between 30 and 50 seconds.

Figure 5:
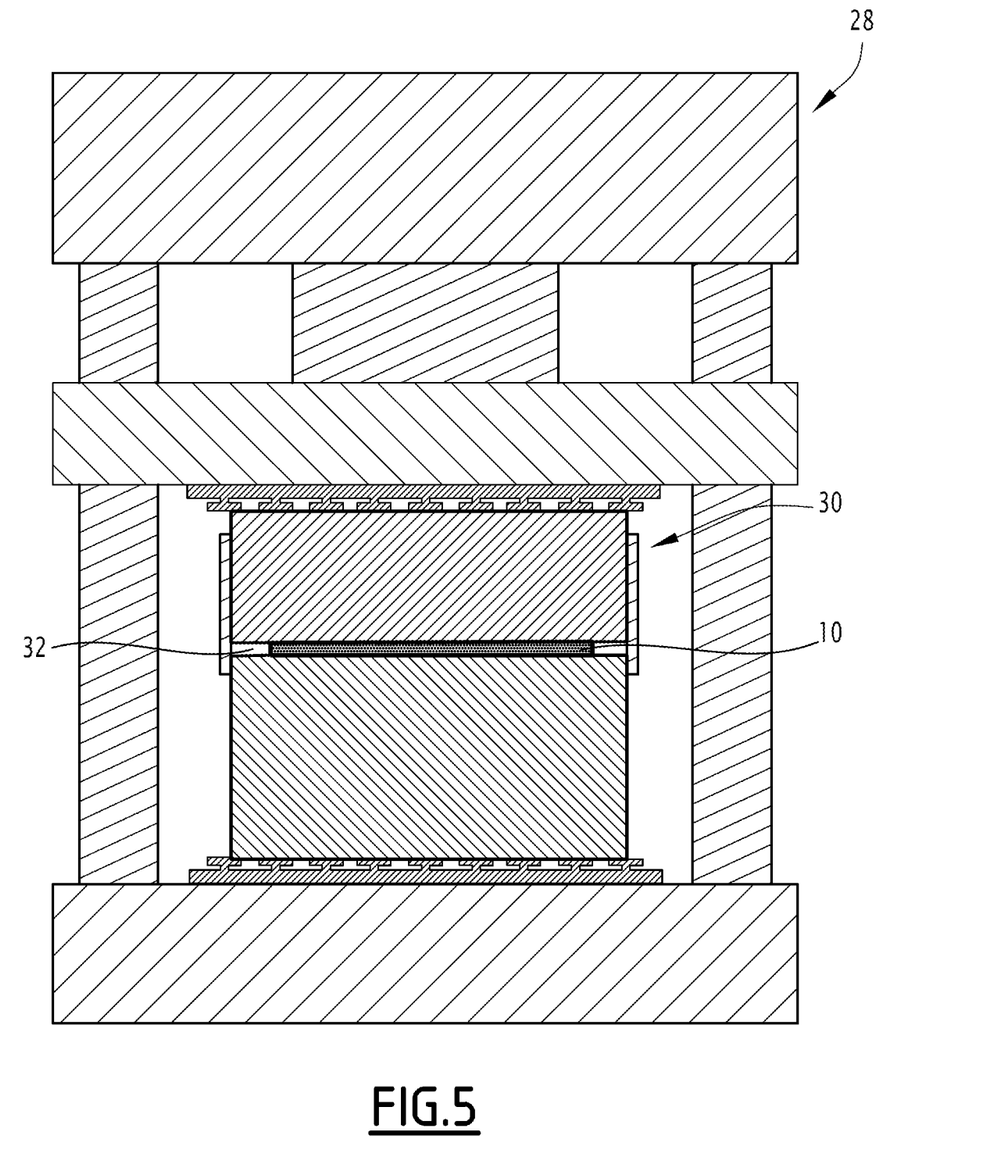

In reference to FIG. 5, the press 30 is next closed. The press 30 continues to heat the complex 24 to a temperature higher than the melting temperature of the thermoplastic material 13, and simultaneously applies a production pressure in the space 32 so as to facilitate the impregnation of the thermoplastic material 13 in the fibers 16 of reinforcing layers 17 so as to form a nonconsolidated part. The application of the pressure while the thermoplastic material 13 is already melted makes it possible to cause this material to penetrate the thickness of the reinforcement layers 17 while greatly limiting its tendency to creep toward the periphery of the part under the effect of the production pressure. The production pressure is greater than the atmospheric pressure, for example between 1 and 20 bars, advantageously between 2 and 10 bars. In one variant, the value of the production pressure varies over time.

This heating step with application of pressure lasts between 20 and 60 seconds, advantageously between 20 and 40 seconds.

Thus, in the space 32, the thermoplastic material 13 liquefies and impregnates the fibers 16 of the reinforcement layers 17 under the effect of the heat and the pressure in the space 32. The obtained nonconsolidated part is flexible or plastically deformable.

In comparison, with no treatment step in the treatment tool 26, the complex 24 spends substantially 90 seconds during the heating step with no application of pressure, and next 60 seconds during the heating step with application of pressure in the press 30 in order to obtain a prepreg 10.

The nonconsolidated part is next cooled in order to obtain a consolidated prepreg 10.

Advantageously, the press 30 is also suitable for being cooled by a cooling device. Such a device for example comprises pipes arranged near the space 32. A cooling fluid, for example water, circulates in the pipes in order to cool the space 32. In this case, after the formation of the nonconsolidated part, the press 30 being kept closed, the space 32 is actively cooled in order to consolidate the nonconsolidated part. "Actively" means that the cooling device of the press 30 is used in order to accelerate the cooling of the nonconsolidated part located in the space 32. The press 30 being cooled to a temperature lower than the melting temperature of the PET, the thermoplastic material 13 solidifies and the nonconsolidated part then consolidates in the space 32 and forms a consolidated prepreg 10. Advantageously, during the cooling, a second pressure is applied in the space 32. The second pressure in particular makes it possible to further reduce the porosity of the thermoplastic material 13 of the nonconsolidated part.

After the consolidation in the space 32, the consolidated prepreg 10 is removed from the press 30.

In a variant, instead of cutting the complex 24 before the impregnation to dimensions smaller than or equal to a corresponding dimension of the finished part that the prepreg 10 will be intended to manufacture, the prepreg 10 is cut to the shape to be manufactured after impregnation.

In a variant, the complex 24 is heated in a first press and cooled in a second press. The cooling is thus done in another press, which makes it possible to keep the press for manufacturing the nonconsolidated part at a desired heating temperature and not to have to cool it and heat it alternately.

Figure 6:
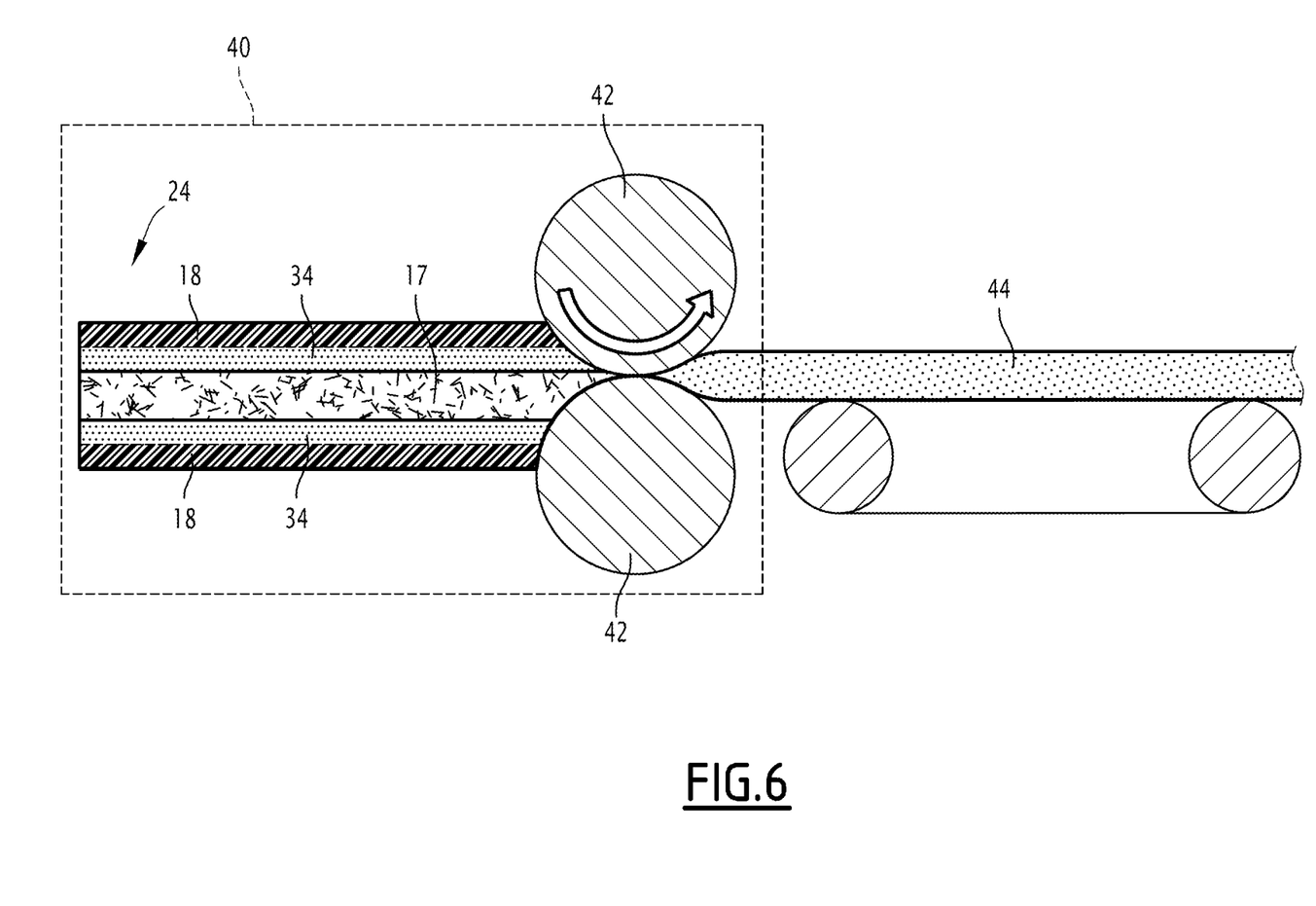
FIG. 6 is a schematic illustration of the production tool according to a second embodiment of the invention during a step of the production method.

According to a second embodiment of the invention shown in FIG. 6, after forming the complex 24, the complex 24 is placed in a heated chamber 40 comprising the production rollers 42. The heated chamber 40 is heated to a temperature higher than the melting temperature of the thermoplastic material 13 in order to melt the thermoplastic material 13 without applying pressure on the complex 24. The production rollers 42 apply a production pressure on the complex 24 such that when the complex 24 passes between the production rollers 42, thermoplastic material 13 impregnates the fibers 16 of the reinforcement layers 17 in order to form a nonconsolidated layer 44.

The nonconsolidated layer 44 is next cut into a part having the shape of the prepreg 10 to be manufactured.

The method described above in particular makes it possible to obtain a prepreg 10 made of a composite material having a thickness e, the thickness e of the prepreg 10 advantageously being between 0.4 mm and 15 mm.

Owing to the step for heating without applying pressure in the production tool 28 described above, it is possible to limit the creep of the thermoplastic material 13 at the periphery of the prepregs 10 during the impregnation, which improves the properties of the prepreg 10.

Furthermore, the step for crushing in the treatment tool 26 makes it possible to reduce the thickness of the matrix sheets 18 in order to facilitate the following steps of the method.

Moreover, a good mechanical strength of the prepreg 10 is ensured by the greater thickness of the matrix sheets 18. Indeed, owing to the invention described above, the obtained prepreg 10 has a flexural modulus greater than 20 GPa and a breaking strength greater than 400 MPa. The invention for example makes it possible to obtain organo-sheets having features similar to organo-sheets made from a matrix made of a thermoplastic material for half the cost.

The prepregs 10 thus obtained can be used in any known method for manufacturing parts, for example stamping and/or overmolding.

The invention claimed is:

1. A method for manufacturing an intermediate prepreg, intended to form at least one portion of a finished part, said prepreg being made from a composite material comprising a matrix made from a thermoplastic material and reinforcing fibers embedded in the matrix, the method comprising the following consecutive steps:
providing at least one reinforcement layer and at least one matrix sheet made of thermoplastic material;
forming a complex with said reinforcement layer and said matrix sheet; and
placing the complex in a prepreg production tool, the production tool being heated to a temperature higher than the melting temperature of the thermoplastic material so that the thermoplastic material impregnates the fibers of the reinforcement layer(s) in order to form a prepreg,
wherein before placing the complex in the production tool, the method comprises the following consecutive steps:
placing at least the matrix sheet in a treatment tool; and
heating said matrix sheet to a temperature lower than the melting temperature of the thermoplastic material,
wherein the method comprises, in the production tool, the following consecutive steps:
heating the complex to a temperature higher than the melting temperature of the thermoplastic material without applying pressure on said complex,
heating the complex to a temperature higher than the melting temperature of the thermoplastic material while applying a production pressure higher than atmospheric pressure on the complex, and
wherein the treatment tool comprises two plates between which the matrix sheet is heated and crushed by applying pressure on the matrix sheet with the two plates.

2. The method for manufacturing a prepreg according to claim 1, wherein the matrix sheet is placed in the treatment tool with the rest of the complex.

3. The method for manufacturing a prepreg according to claim 1, wherein the temperature of the treatment tool is between 70° C. and 200° C.

4. The method for manufacturing a prepreg according to claim 1, wherein the thermoplastic material comprises polyethylene terephthalate.

5. The method for manufacturing a prepreg according to claim 1, wherein the complex comprises at least two matrix sheets placed on a first side of the reinforcement layer, and at least one matrix sheet placed on a second side of said reinforcement layer.

6. The method for manufacturing a prepreg according to claim 5, wherein the complex comprises at least two reinforcement layers, each reinforcement layer being placed between at least two matrix sheets on a first side and at least one matrix sheet on a second side.

7. The method for manufacturing a prepreg according to claim 6, wherein the reinforcement sheets have at least two different fiber orientations.

8. The method for manufacturing a prepreg according to claim 7, wherein the formation of the complex comprising said reinforcement sheets having at least two different fiber orientations is done outside the production tool.

9. The method for manufacturing a prepreg according to claim 1, wherein the pressure applied on the complex by the production tool is between 1 bar and 20 bars.

10. The method for manufacturing a prepreg according to claim 3, wherein the temperature of the treatment tool is equal to 150° C.

11. The method for manufacturing a prepreg according to claim 9, wherein the pressure applied on the complex by the production tool is between 2 bars and 10 bars.

12. The method for manufacturing a prepreg according to claim 1, wherein the production tool comprises a press having a space configured to accommodate the complex, the space being defined between a first press surface configured to support the complex, a second press surface opposite to the first press surface, and at least one sidewall enclosing the space within which the complex is accommodated by placing the complex in the prepreg production tool.

13. The method for manufacturing a prepreg according to claim 1, wherein the complex comprises:
   a first matrix sheet on a first side of the reinforcement layer and in direct physical contact with the first side of the reinforcement layer;
   a second matrix sheet on a second side of the reinforcement layer opposite to the first side of the reinforcement layer and in direct physical contact with the second side of the reinforcement layer; and
   a third matrix sheet on the second side of the reinforcement layer and in direct physical contact with the second matrix sheet, wherein the second matrix sheet is sandwiched between the reinforcement layer and the third matrix sheet.

14. A method for manufacturing an intermediate prepreg, intended to form at least one portion of a finished part, the method comprising:
   forming an initial complex by combining a matrix layer comprising a thermoplastic material and a reinforcement layer comprising reinforcing fibers, wherein the matrix layer is in direct physical contact with the reinforcement layer, wherein the initial complex has a first thickness;
   processing the initial complex in a treatment tool comprising two plates between which the complex is heated and crushed by applying a first pressure greater than an atmospheric pressure in the treatment tool to form a thinned complex having a second thickness less than the first thickness, wherein the treatment tool heats the initial complex to a temperature lower than a melting temperature of the thermoplastic material, and heating and crushing of the initial complex forms the thinned complex; and
   processing the thinned complex by a production tool, physically separated from the treatment tool, wherein the processing the thinned complex by the production tool, comprises:
      first heating the thinned complex to a first temperature higher than the melting temperature of the thermoplastic material without applying pressure to cause the thermoplastic material to impregnate the reinforcing fibers of the reinforcement layer by a first amount, the first heating being for a first preset period of time, wherein the first heating forms a semi-prepreg; and
      second heating the semi-prepreg to a second temperature higher than the melting temperature of the thermoplastic material while applying a second pressure higher than an atmospheric pressure in the production tool on the semi-prepreg to cause the thermoplastic material to further impregnate the reinforcing fibers of the reinforcement layer by a second amount greater than the first amount, the second heating while applying the second pressure being for a second preset period of time to form the intermediate prepreg.

15. The method for manufacturing a prepreg according to claim 14, wherein the intermediate prepreg formed by the second heating is a non-consolidated intermediate prepreg, and the method further comprises:
   cooling the non-consolidated intermediate prepreg to a temperature below the melting temperature of the thermoplastic material by way of a heat exchanger while applying a third pressure greater than the atmospheric pressure to form a consolidated intermediate prepreg,
   wherein the third pressure is applied by a press of the production tool configured to apply the second pressure while the semi-prepreg is heated to the second temperature higher than the melting temperature of the thermoplastic material, and to apply the third pressure while cooling the non-consolidated intermediate prepreg to the temperature below the melting temperature of the thermoplastic material by way of the heat exchanger.

16. The method for manufacturing a prepreg according to claim 14, wherein the intermediate prepreg formed by the second heating is a non-consolidated intermediate prepreg, and the method further comprises:
   cooling the non-consolidated intermediate prepreg to a temperature below the melting temperature of the thermoplastic material by way of a heat exchanger while applying a third pressure greater than the atmospheric pressure to form a consolidated intermediate prepreg,
   wherein
      the second pressure is applied by a first press of the production tool configured to apply the second pressure while the semi-prepreg is heated to the second temperature higher than the melting temperature of the thermoplastic material,
      the third pressure is applied by a second press separate from the first press configured to apply the third pressure while cooling the non-consolidated intermediate prepreg to the temperature below the melting temperature of the thermoplastic material by way of the heat exchanger,
      and a press temperature of the first press is maintained at the second temperature while cooling the non-consolidated intermediate prepreg and applying the third pressure.

17. The method for manufacturing a prepreg according to claim 14, further comprising:
   cutting the thinned complex to form a sheeted thinned complex, wherein the thinned complex processed by the production tool is the sheeted thinned complex.

18. The method for manufacturing a prepreg according to claim 14, wherein
   the matrix layer is a first matrix sheet,
   the reinforcement layer is a first reinforcement layer,
   the reinforcing fibers of the first reinforcement layer are first reinforcing fibers oriented in a first direction,
   the first matrix sheet is on a first side of the first reinforcement layer and in direct physical contact with the first side of the first reinforcement layer, and
   the initial complex further comprises:
      a second matrix sheet on a second side of the first reinforcement layer opposite to the first side of the first reinforcement layer and in direct physical contact with the second side of the first reinforcement layer;
      a third matrix sheet on the second side of the first reinforcement layer and in direct physical contact with the second matrix sheet, wherein the second matrix sheet is sandwiched between the first reinforcement layer and the third matrix sheet; and
      a second reinforcement layer,
   wherein
      the second reinforcement layer is on the third matrix sheet and in direct physical contact with the third matrix sheet such that the third matrix sheet is sandwiched between the second matrix sheet and the second reinforcement layer, and the second reinforcement layer comprises second reinforcing fibers oriented in a second direction different from the first direction.

19. The method for manufacturing a prepreg according to claim 14, wherein the matrix layer is a first matrix sheet, the reinforcement layer is a first reinforcement layer, the reinforcing fibers of the first reinforcement layer are first reinforcing fibers oriented in a first direction, the first matrix sheet is on a first side of the first reinforcement layer and in direct physical contact with the first side of the first reinforcement layer, and the initial complex further comprises:
- a second matrix sheet on a second side of the first reinforcement layer opposite to the first side of the first reinforcement layer and in direct physical contact with the second side of the first reinforcement layer;
- a third matrix sheet on the second side of the first reinforcement layer and in direct physical contact with the second matrix sheet, wherein the second matrix sheet is sandwiched between the first reinforcement layer and the third matrix sheet; and
- a second reinforcement layer, wherein the second reinforcement layer is on the first matrix sheet and in direct physical contact with the first matrix sheet such that the first matrix sheet is sandwiched between the first reinforcement layer and the second reinforcement layer, and the second reinforcement layer comprises second reinforcing fibers oriented in a second direction different from the first direction.

20. A method for manufacturing an intermediate prepreg, intended to form at least one portion of a finished part, the method comprising:

processing an initial matrix layer having a first thickness comprising a thermoplastic material in a treatment tool comprising two plates between which the initial matrix layer is heated and crushed by applying a first pressure greater than an atmospheric pressure in the treatment tool to form a thinned matrix layer having a second thickness less than the first thickness, wherein the treatment tool heats the initial matrix layer to a temperature lower than a melting temperature of the thermoplastic material, and heating and crushing of the initial matrix layer forms the thinned matrix layer;

forming an initial complex having by combining the thinned matrix layer and a reinforcement layer comprising reinforcing fibers, wherein the thinned matrix layer is in direct physical contact with the reinforcement layer, processing the initial complex by a production tool, physically separated from the treatment tool, wherein the processing the initial complex by the production tool, comprises:
- first heating the initial complex to a first temperature higher than the melting temperature of the thermoplastic material without applying pressure to cause the thermoplastic material to impregnate the reinforcing fibers of the reinforcement layer by a first amount, the first heating being for a first preset period of time, wherein the first heating forms a heated complex; and
- second heating the semi-prepreg to a second temperature higher than the melting temperature of the thermoplastic material while applying a second pressure higher than an atmospheric pressure in the production tool on the heated complex to cause the thermoplastic material to further impregnate the reinforcing fibers of the reinforcement layer by a second amount greater than the first amount, the second heating while applying the second pressure being for a second preset period of time to form the intermediate prepreg.

* * * * *